United States Patent
Barraclough et al.

(10) Patent No.: US 8,300,552 B1
(45) Date of Patent: Oct. 30, 2012

(54) NETWORK INTERFACE UNIT CONTROL SYSTEM AND METHOD THEREFOR

(75) Inventors: Keith Barraclough, Menlo Park, CA (US); Bryan R. Martin, Campbell, CA (US); Philip Bednarz, Menlo Park, CA (US); Paul Voois, Sunnyvale, CA (US)

(73) Assignee: 8x8, Inc., San Jose, CA (US)

( * ) Notice: Subject to any disclaimer, the term of this patent is extended or adjusted under 35 U.S.C. 154(b) by 290 days.

(21) Appl. No.: 12/819,946

(22) Filed: Jun. 21, 2010

Related U.S. Application Data

(63) Continuation of application No. 09/740,263, filed on Dec. 18, 2000.

(60) Provisional application No. 60/172,539, filed on Dec. 17, 1999.

(51) Int. Cl.
H04L 12/28 (2006.01)
H04L 12/56 (2006.01)
H04M 1/64 (2006.01)

(52) U.S. Cl. .................. 370/254; 370/395.52; 370/401; 370/466; 379/88.17

(58) Field of Classification Search .................. 370/231, 370/242, 244, 248, 249, 254, 395.5–395.72, 370/400–407, 464–469; 379/22.03, 88.17, 379/88.26, 230, 279, 399.01, 413.04
See application file for complete search history.

(56) References Cited

U.S. PATENT DOCUMENTS

| | | | |
|---|---|---|---|
| 4,837,798 A | 6/1989 | Cohen et al. | |
| 5,379,351 A | 1/1995 | Fandrianto et al. | |
| 5,410,326 A | 4/1995 | Goldstein | |
| 5,574,964 A | 11/1996 | Hamlin | |
| 5,722,041 A | 2/1998 | Freadman | |
| 5,835,126 A | 11/1998 | Lewis | |
| 5,905,942 A | 5/1999 | Stoel et al. | |
| 6,104,334 A | 8/2000 | Allport | |
| 6,124,882 A * | 9/2000 | Voois et al. | 348/14.08 |
| 6,441,842 B1 | 8/2002 | Fandrianto et al. | |
| 6,505,255 B1 * | 1/2003 | Akatsu et al. | 709/239 |
| 6,526,581 B1 | 2/2003 | Edson | |
| 6,611,537 B1 | 8/2003 | Edens et al. | |
| 6,954,454 B1 * | 10/2005 | Schuster et al. | 370/352 |
| 7,065,709 B2 | 6/2006 | Ellis et al. | |
| 7,899,915 B2 * | 3/2011 | Reisman | 709/228 |
| 2002/0054601 A1 * | 5/2002 | Barraclough et al. | 370/401 |
| 2003/0140121 A1 * | 7/2003 | Adams | 709/219 |
| 2010/0125353 A1 | 5/2010 | Petit-Huguenin | |

* cited by examiner

*Primary Examiner* — Tri H Phan
(74) *Attorney, Agent, or Firm* — Crawford Maunu PLLC

(57) ABSTRACT

External-services data are processed for use in a user facility in a manner that enables easy user interface and control. According to an example embodiment of the present invention, an arrangement for processing external-services data includes an audio, video, and data signal bussing arrangement adapted to distribute audio, video, and data to designated points in a user facility. A plurality of appliances are communicatively coupled to the bussing arrangement and adapted to receive and process one or more audio, video, and data signals. A user input device is adapted to command a network interface unit (NIU) to process the external-services data for use at a particular one of the plurality of appliances in the user facility. External-services data is delivered over the bussing arrangement and to one or more of the plurality of appliances using the (NIU).

23 Claims, 3 Drawing Sheets

NETWORK INTERFACE UNIT CONTROL SYSTEM AND METHOD THEREFOR

RELATED PATENT DOCUMENTS

This patent document is a continuation under 35 U.S.C. §120 of U.S. patent application Ser. No. 09/740,263 filed on Dec. 18, 2000; which claims benefit under 35 U.S.C. §119(e) of U.S. Provisional Patent Application Ser. No. 60/172,539, entitled "Network Interface Unit Control System And Method Therefor" and filed on Dec. 17, 1999. This patent document is also related to U.S. Pat. No. 5,379,351 entitled "Video Compression and Decompression Processing and Processors," and to U.S. patent application Ser. No. 09/098, 106 (U.S. Pat. No. 6,441,842) entitled "Videocommunicating Apparatus and Method Therefor." Each of these patent documents is fully incorporated herein by reference.

FIELD OF THE INVENTION

The present invention relates generally to interfacing and controlling the interface of different communication systems and, more particularly, to network interface circuits and approaches for interfacing external service-provider networks, and a target facility, such as a residence.

BACKGROUND OF THE INVENTION

The electronics industry continues to rely upon advances in technology to realize higher-functioning devices at cost-effective prices. For many communication applications, realizing higher-functioning devices in a cost-effective manner requires creative use of communications channels. There have been many technologies developed recently that have permitted such cost-effective communication. Examples include Internet applications enabling a user access to a seemingly unlimited number of web sites and other users, cable TV systems enabling a user to view any of a hundred or more channels, and video-image processing techniques that enable video data to be communicated simultaneously with voice data over a plain old telephone service (POTS) line. As the popularity of these technologies increases, so does the need to merge and coordinate these technologies in a manner that is convenient and cost-effective for the user.

The above-mentioned need is being increasingly addressed through the introduction of network systems providers. Network systems providers sell communication services for individuals, companies and the like to communicate with a plurality of communication systems. This is typically accomplished using Network Interface Units (NIU) to provide an interface between a network system, such as a broadband digital cable network, and a customer's premises. These devices are often in a location that is inaccessible to the user of the network. For example, for digital cable telephony systems, an NIU is often placed at a building which is passed by a cable network. This enables the premises to be supplied with cable service and multiple telephony lines of voice, video or data services. As another example, NIUs are used in Digital Subscriber Line (DSL) systems to provide access to multiple voice, video and data connections provided through a DSL line.

In cable systems, the telephony signal is transported on the cable system and can be supplied by a modulated carrier-based Hybrid Fiber Coaxial system or by a packet based cable network, and can be facilitated using a cable modem. The streams of audio, video, and data are input to the device in digital form. This enables the NIU to perform signal-processing tasks on the incoming streams and to store data from these streams in memory either in the NIU or in memory devices in the network.

One example type of cable system includes a broadband wireless system using a wireless broadband modem. Typical wireless broadband systems can provide up to or exceed 30 Mbps of data transfer over a 6 MHz channel, providing high burst speed access to a local area. The area of coverage of such wireless systems varies with the frequency used, but typically can serve up to or exceed a 30-mile radius. One type of broadband wireless system transmits data from a wireless provider down to receiver that receives the information and provides it to a wireless modem. The return signal is sent up via other communication systems, such as those including POTS, T1, DSL, or coaxial cable. Another type of wireless broadband system uses two-way wireless communication, wherein both the down (incoming) and the up (outgoing) communications are wireless. As with a conventional cable system using coaxial cable as a data transfer medium, an NIU can be used to perform signal-processing tasks on both the down and up information.

Widespread acceptance and usage of NIU-based communication services are largely a function of cost and user convenience. Therefore, widespread acceptance and usage of such technology cannot be forced, even when appropriately addressing the marketing needs and overcoming the exorbitant costs of the mass production equipment. For both the unsophisticated and sophisticated users of such communication services, it is important to provide straight-forward, user-friendly control over the NIUs and over the devices that interface with and configure the NIUs.

SUMMARY OF THE INVENTION

The present invention is directed to programmable communication control arrangements and methods for programming the same. According to one example embodiment, the present invention addresses the above-discussed issues through a system and method of controlling an NIU and enabling configuration of an NIU-based system for a user facility. The NIU-based system includes an audio, video, and data signal bussing arrangement adapted to distribute audio, video, and data to a plurality of appliances communicatively coupled to the bussing arrangement. Each of the plurality of appliances is adapted to receive and process one or more types of the distributed signals. A NIU is coupled to the bussing arrangement and is adapted to communicatively couple the external services data over the bussing arrangement and with the plurality of appliances in the user facility. Using an input device adapted to command the NIU, external-services data is processed for use in the user facility.

According to another example embodiment of the present invention, a network interface system is arranged for interfacing different types of communication systems including a first user-based communication system and a packet-based communication system. A data memory circuit is adapted to store configuration data for the system. A processor arrangement is adapted to write configuration data into and read configuration data from the memory circuit and to provide data for presenting configuration information for accessing at a user communication device. The processor arrangement is further adapted to process data received from, and exchange processed data between, the first user-based communication system and the packet-based communication system. In response to the configuration data, the processor arrangement is adapted to route selected information provided by the packet-based communication system to selected channels of the first user-based communication system. A user input arrangement is used for inputting configuration-defining control signals. The processor arrangement responds to the configuration-defining control signals by changing the configuration data in the memory circuit and by rerouting selected information provided by the packet-based communication system to selected channels of the first user-based communication system according to the configuration-defining control signals.

According to another example embodiment of the present invention, a network interface system is arranged for interfacing different types of communication systems including a first user-based communication system and a packet-based communication system. The system includes a data memory circuit adapted to store data for use in the system. A processor arrangement is adapted to write data-intercept select data into and read data-intercept select data from the memory circuit and to provide data for communicating with a user via a user communication device. The processor arrangement is further adapted to process data received from, and exchange processed data between, the first user-based communication system and the packet-based communication system. In response to the data in the data memory circuit, the processor arrangement is also adapted to intercept information from the packet-based communication system and to store the intercepted information in the data memory circuit. A user input arrangement is adapted to input message-retrieval control signals that the processor arrangement responds to by displaying messages (email, voice mail, etc.) from the data memory circuit.

According to yet another example embodiment of the present invention, a method is used to control communications data in a communications system having a NIU, a user interface device, a plurality of communications appliances, and a bussing system. The user interface device is used and the NIU is programmed with configuration information for external-services data. The external-services data is received at the NIU and, responsive to the configuration information, the received external-services data is configured and transferred via the bussing arrangement to one of the communications appliances.

Other aspects of the present invention are directed to example methods and application-specific implementations relating to the above arrangements.

The above summary is not intended to characterize each embodiment of the present invention. Other aspects of the present invention are provided by way of example upon review of the figures and corresponding description of the drawings.

BRIEF DESCRIPTION OF THE DRAWINGS

The invention may be more completely understood in consideration of the following detailed description of various embodiments of the invention in connection with the accompanying drawings, in which.

Figure 1:
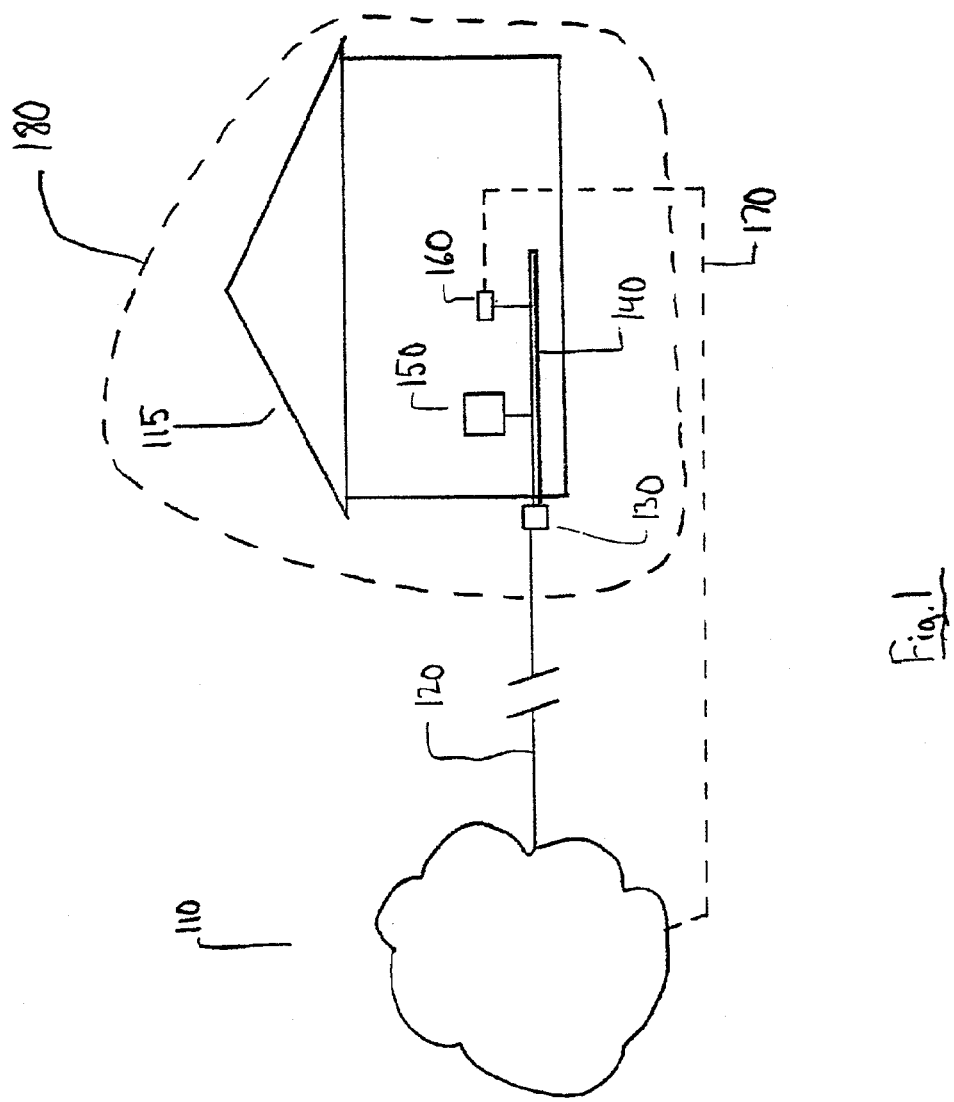
FIG. 1 is a communications arrangement in a user facility, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of data communications systems, and the invention has been found to be particularly suited for enabling and controlling communications between one or more communications networks and a facility, and between appliances located in the facility. While the present invention is not necessarily limited to such applications, various aspects of the invention may be appreciated through a discussion of various examples using this context.

According to one example embodiment of the present invention, a system and method are used for controlling an NIU and enabling configuration of an NIU-based system for a user facility. In one implementation, the customer/user inputs NIU configuration information via an unsophisticated user-friendly device such as a telephone keypad, a computer accessing an Internet web page, or a dedicated input such as an infrared remote control. Such customer/user configuration may include, for example, selecting an option from a command menu either displayed visually or played audibly. The audible menu may be played using, for example, a voice generating device or a prerecorded message. In another implementation, an external-services provider, such as a cable television, Internet, or telephone services provider, inputs NIU configuration information via communications lines coupling the external-services provider with the NIU. In still another implementation, a combination of customer/user and external-service provider inputs is used to configure the NIU.

The NIU-based system includes an audio, video, and data signal bussing arrangement adapted to distribute audio, video, and data to designated points in the user facility. The bussing arrangement includes one or more types of communication lines communicatively coupled to a plurality of appliances. Each of the plurality of appliances is adapted to receive and process one or more types of the distributed signals. The NIU is coupled to the bussing arrangement and is adapted to communicatively couple the external services data over the bussing arrangement and with the plurality of appliances in the user facility. Using an input device adapted to command the NIU, external-services data is configured for use in the user facility. For example, configuring the external-services data may include routing the data to a particular one of the plurality of appliances, enabling the use of a particular type of data to a limited number of appliances, or converting the data from a first form to a second form, such as from analog to digital or packet-based to non-packet-based.

One example application of the present invention includes a network interface system adapted to interface a user-based communication system and a packet-based communication system. The system includes a data memory circuit, a user communication device, a processor, and a user input device, some or all of which may be included in a single NIU. The data memory circuit is adapted to store configuration data. The processor is adapted to write to and read from the data memory circuit and to provide the configuration information for access at the user communication device. The processor further processes data received from, and exchanges processed data between the first user-based communications system and the packet-based communication system, and routes selected information provided by the packet-based system to selected channels of the first user-based system. The user input device is adapted to input configuration-defining control signals for changing the configuration data and rerouting the selected information to other selected channels of the first user-based system.

In another example application, the data memory circuit is adapted to store data intercept select data. The processor is adapted to provide data for communicating with a user via the communication device, to intercept information from the packet-based system, and to store the intercepted data in the data memory circuit. The user input device is adapted to input message-retrieval control signals from the processor in the form of displayed messages, such as email or voice mail, from the memory circuit.

The user-based communications system may, for example, include a network such as a computer network or a bussing arrangement. In addition, the user input device and the user-based communications system may be part of the same device. Other example devices and systems that may be used in connection with the user-based system, packet-based system, input and communications devices, as well as methods for controlling, configuring, and operating these systems are described in connection with other example embodiments that follow below.

In one particular example embodiment, the NIU includes a printed circuit board (PCB) that has at least one general processor and at least one specific processor adapted to process video data. The PCB also may include in additional processors such as a RISC processor and/or a DSP processor. For more information regarding NIU-related devices suitable for use in conjunction with the present invention, reference may be made to "8×8 Application Note: Symphony VoIP Access Gateway."

Another example embodiment of the present invention includes using an arrangement such as described herein in a household. FIG. 1 shows an external-services provider 110 coupled via a communications line 120 to a NIU 130 for use in a household 115. The NIU 130 is adapted to configure the external-services data received via communications line 120. The NIU is further coupled to a bussing arrangement 140 adapted to deliver the external-services data to one or more appliances 150 or 160 in the house. Optionally, another communications line 170 is coupled from appliance 160 to the external-services provider 110. The portion of FIG. 1 connected to the NIU labeled as "Facility Internal" corresponds to the user-based system, and the portion labeled as "External Providers" corresponds to the packet-based system as described above, according to one particular implementation.

In another example embodiment of the present invention, an appliance interface device is coupled between the appliance and the bussing arrangement and adapted to exchange data between the bussing arrangement and the appliance. The interface device can be adapted to receive data of a first type from the bussing arrangement and convert the data to a second type for delivery to the appliance. When sending data from the appliance to the bussing arrangement, the interface device converts the data of the second type to data of the first type. The interface device may also be adapted to receive data from a first type of communications line, and to transfer the data to a second type of communications line. For example, the bussing arrangement may include a digital cable line, and the interface device can be coupled to an ordinary telephone having a two-wire analog system. The interface device receives digital data from the bussing arrangement and converts the data into DTMF (dual-tone, multi-frequency) tones transferred over the two-wire analog system and receivable by the telephone. When the telephone sends a signal via the two-wire analog system, the interface device converts the signal to a digital signal and sends the signal via the bussing arrangement. In addition to the conversion of digital data to analog data as described herein, the interface device may be adapted to make data conversions as is necessary for use in connection with various household appliances, some of which have been described in connection with the present invention and shown by example illustration in the figures appended hereto.

The interface device may be manufactured to convert the first type of data to a second type of data, or to connect the first type of communications line to the second type of communications line. Alternatively, the interface device is programmable for converting various types of data and connecting to various communication lines. In one implementation, the NIU configures the interface device. In another implementation, the interface device is programmed using a user appliance. In still another implementation, the interface device is programmed as part of its manufacture.

Figure 2:
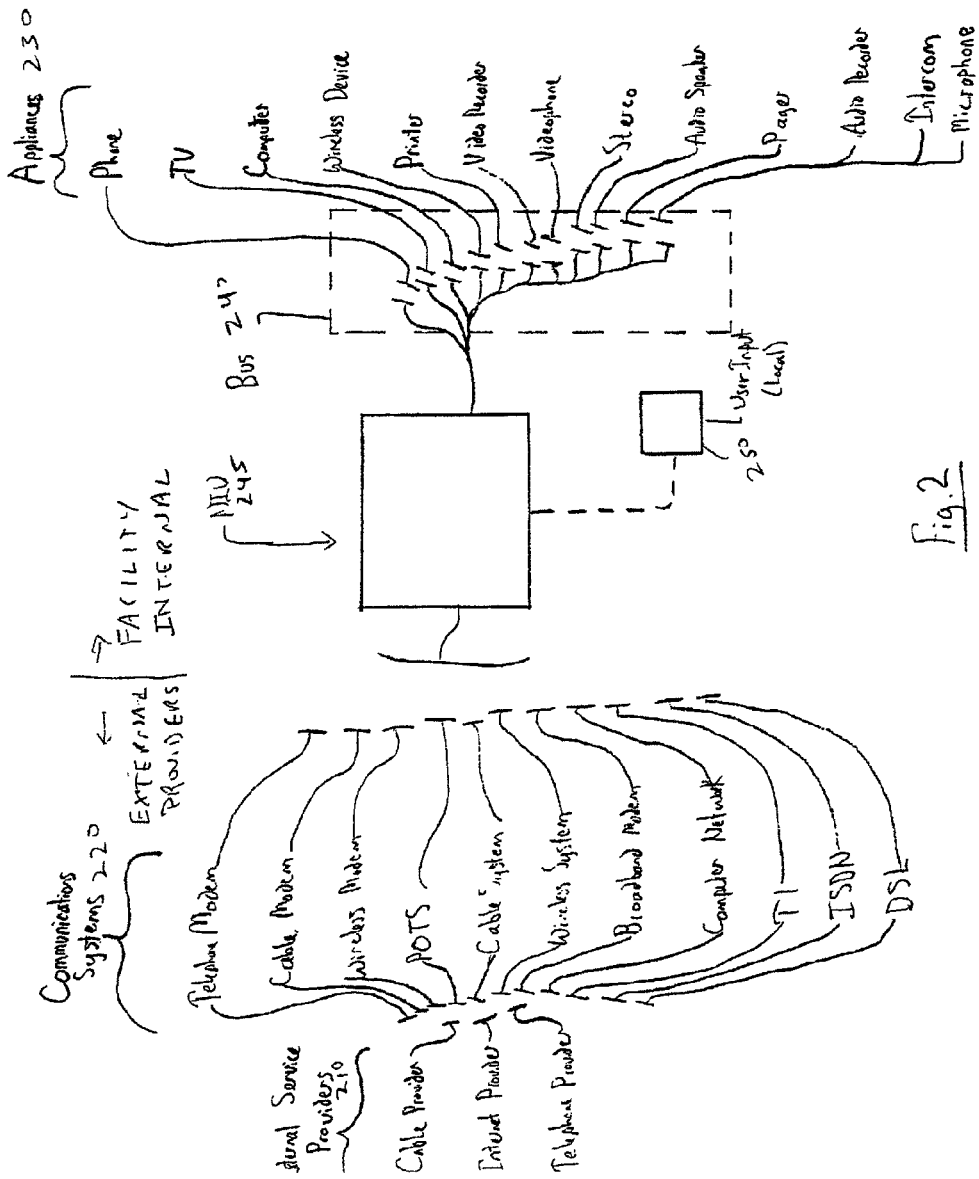
FIG. 2 shows a communication system having several example system components, according to particular embodiments of the present invention.

Various appliances, communications lines, and methods of communication may be used in connection with FIG. 1. For example, FIG. 2 shows several example types of service providers 210, communications systems 220, appliances 230, and bus arrangements 240, that can be used in connection with the present invention. Though not shown, the bussing arrangements 230 may include one of, all of, or more than the types of communications systems shown for use in coupling the NIU 245 to external-service providers. In addition, the user input device 250 may include one of, all of, or more than the types of appliances listed for connection to the NIU 245 via the communications system included in the bus, and yet others include a telephone keypad, an IR key panel, a wall-mount unit for the system, and a voice recognition system. Several of the examples shown in FIG. 2 will be described herein in connection with particular embodiments of the present invention. It will be apparent that other examples consistent with the above may be implemented in place of or in conjunction with the examples provided herein.

As technology advances, many of the types of appliances listed in FIG. 2 are capable of receiving information using more than one communications method. One example embodiment includes the use of broadband technology to deliver and exchange information of different types using the same communications line. For instance, a coaxial cable installed in the bussing arrangement can, in addition to delivering cable television, deliver other information such as Internet and telephony information. In this manner, the user can use the telephony appliance 160 to request a service change to the services provider using the same cable that is used for sending a signal to the television. Other broadband applications include wireless cable systems, wherein the user facility receives data via a down converter from a local wireless transmitter. Available wireless systems include one-way wireless, wherein the user facility receives data via the down converter and sends data via a second line, and two-way wireless, wherein the user both sends and receives information.

In one particular example embodiment, a method for configuring the NIU includes using an appliance 150 that includes a viewing device, such as a television, and appliance 160 that includes a telephony device, such as a telephone or an Internet telephony device, wherein the external-services provider sends the configuration information to the NIU. The NIU sends a signal to the television that includes configuration information for the NIU for display on the television screen. A user in the house views the configuration information and uses the telephony device to contact the external-services provider if any changes in service are desired. The external-services provider then sends new configuration information to the NIU to reflect the desired changes. This is useful for managing the services provided to the household or other location which includes the NIU.

As an alternative to using a telephony device in the above example embodiment, the viewing appliance itself is used to send a signal reflecting a desired change in the configuration of the NIU, according to another example embodiment of the present invention. For instance, the viewing appliance may include a television having a remote control. The remote control is used to select configuration options from the television screen. The selected options are sent to the NIU, which in turn sends a signal to the external-services provider reflecting the desired changes. In response to the request, the external-services provider sends a signal having configuration information for the desired changes to the NIU.

In another example embodiment, the user is authorized by the external-services provider to make configuration changes to the NIU. When the user makes changes, the NIU notifies the external-services provider of the changes. The external-services provider can then use the notification to bill the user for the services selected. In one implementation, the selected changes are sent to the external-services provider, and the NIU receives only the selected services that are requested from the external-services provider. In another implementation, the NIU receives a full range of services, such as a full range of pay-per-view television selections available from the external-services provider. Based on the configuration selections of the user, the NIU enables use of the external-services only for those selections, and a change in services provided by the external-services provider is not necessary.

In still another implementation, the user configures the NIU to only allow selections from a particular set of external-services data. For example, one configuration only allows the selection of television services having a viewing rating of a particular category. This is useful for parental control of the viewing of movies, television, or other external-services. The configuration of the NIU may also include a password or security code so that a particular user can control the configuration of the device. Alternatively, the NIU may include several levels of password access, wherein individuals in the user facility are enabled various levels of configuration access based upon their password access level. In this manner, the purchasing user (e.g., parent, supervisor) can control the use of the NIU and external-services by other users (e.g., children, employees) in the facility.

In addition to parental control, this implementation has the ability to limit access by employees to services, such as access to certain Internet web sites or access to certain audio or video feeds for videoconferencing purposes. A configurable NIU is particularly useful for videoconferencing, wherein the videoconference data is sent only to intended participants throughout a facility or throughout several facilities. For instance, a company having two or more locations, each having an NIU, can hold a videoconference with employees at each location by configuring the NIU devices to send the data to the participants at both locations. A user sets up the NIU for delivery either by programming the NIU directly or by contacting an external-services provider and requesting the desired NIU configuration. The communication between the facilities is accomplished via an external-services provider, and the confidentiality of the videoconference is maintained by the configuration of the NIU.

Figure 3:
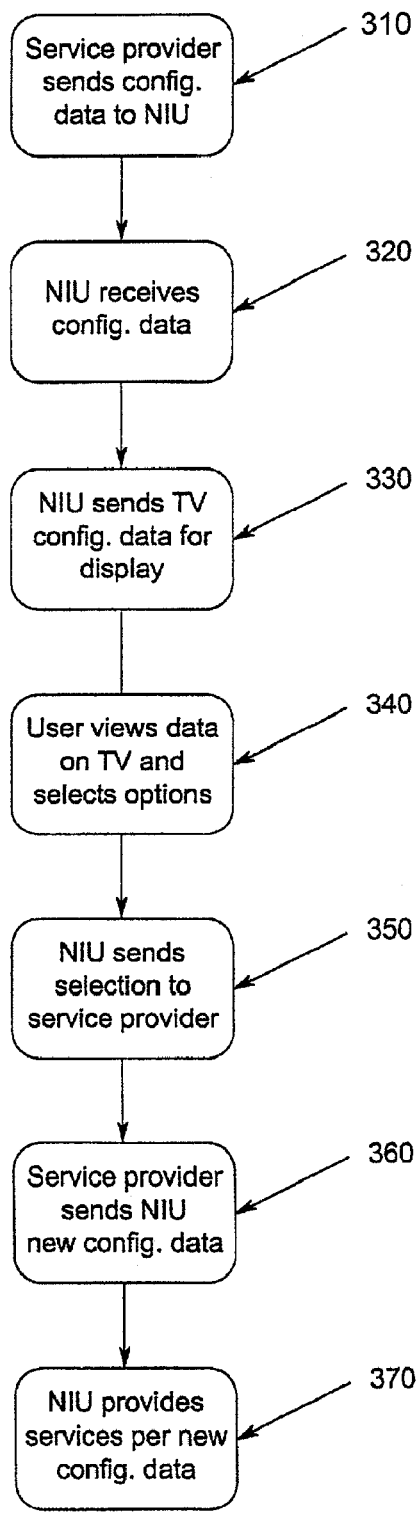
FIG. 3 is an example flow chart used to show a particular implementation of the communication system of FIG. 2, according another example embodiment of the present invention.

FIG. 3 is a flow diagram of a method for using and configuring an NIU using a television display and user selection, such as described above. At block 310, an external-services provider sends configuration data to a NIU, and the NIU receives the data at block 320. The NIU sends configuration data for display on the television display for viewing by the user at block 330. The configuration information may, for example, include configuration information such as which Internet service is being used, which television cable subscription is current, or which telephones in the user facility are assigned to particular telephone numbers. At block 340, a user views the configuration information displayed on the TV, and selects an option from the displayed configuration information. Options may include, for example, ordering a television channel subscription or pay-per-view event, selecting or terminating a service, or requesting the assignment or reassignment of a particular appliance to a service. Once the user has selected an option, the option is communicated to the NIU which delivers the selection to the external-services provider at block 350. The service provider processes the selection and sends the NIU new configuration data consistent with the selection at block 360. In response to the new configuration information, the NIU provides services consistent with the new configuration data at block 370.

In another example embodiment of the present invention, the NIU is adapted to use memory that is adapted to store external-services data, such as audio and video recordings, email, and voicemail. The memory may, for example, be included in the NIU, or may be an external memory, such as part of an appliance in the user facility or at an external-service provider, such as memory located at a communications terminal. One particular implementation includes a method for selecting and receiving downloadable multimedia, such as pay-per-view movies. The user chooses a movie selection from a list, such as displayed on a television set or computer. The choice is delivered to the external-services provider via a communication line using, for example, a telephone, an Internet appliance, or a remote control for selecting a choice displayed on a TV and sent via the NIU to the external-services provider. The external-services provider sends a digital copy of the movie to the NIU in response to the request. The NIU receives the copy and transfers the movie to a selected video display in the user facility. In a more particular implementation, the digital copy of the movie includes configuration information, such as the number of viewing appliances to which it can be sent, the number of times the movie can be viewed, and a timeframe for which viewing of the movie is allowed (e.g., purchasing a 24 hour viewing license).

Another particular implementation includes a method for selecting downloadable music including music recordings typically purchased on media such as compact discs. A user makes a selection from a list of music recordings available for download in a similar manner as described above for purchasing a pay-per-view movie. The selection is sent to the downloadable music provider, such as via the NIU or by using other communications devices independent of the NIU, and the downloadable music provider sends the music data to the NIU. The NIU receives the data from the provider and routes the data via the bussing arrangement to an appliance selected by the user.

Another particular implementation of using the memory at the NIU includes storing email, voice mail, video mail, or other communications at the NIU. A user configures the NIU to store incoming communications data at the NIU for future access. The user then contacts the NIU using a user input device, such as described herein, and directs the NIU to send the message to an appliance. The user input device may also include the capability to view all of the data that is stored as well as the type of data that is stored, either at the user input device or via another appliance such as a TV, and also may include the capability to determine the source of the data. In addition, the user may direct the NIU to configure the information for receipt at a particular appliance. For instance, the NIU may be configured to receive word processing data, such as an email, and configure the data to be sent as a voice message to a telephone, or may simply convert an analog message to digital or vice-versa. In this manner, a user can contact the NIU from a remote location and receive messages sent to the user facility.

In another example embodiment of the present invention, the NIU is configured to provide authorization for a user to receive external-services data by establishing a credit arrangement with the user. For instance, a user can set up an account for use in conjunction with the external-services provider. In one implementation, the user supplies a credit account number, such as a credit card number or a bank account, and the NIU is configured to charge the credit account for the selected external-services. In another implementation, the user provides a debit account to the external-services provider and the NIU deducts funds from that account based upon the selections made for external-services.

According to another example embodiment of the present invention, a NIU is used to control data communications and configurations internally in a user facility. For example, a user can direct signal input and output to and from appliances throughout the facility. One application includes the use of a stereo system and audio speakers. Sound data, such as from a broadcast source (possibly received through the NIU or through other sources), a compact disc player, a cassette player, a video player, or a phonograph player, is sent to the NIU. The user configures the NIU for distribution of the sound to one or more selected audio speakers or audio systems in the home. Using that configuration, the NIU distributes the sound data to each audio speaker.

Configuration of the NIU may include using a user input device to send configuration information to the NIU. The user input device may include a device such as described above for use in contacting an external-service provider, or another type of device. One particular application includes using a bussing arrangement having a two-wire analog system, wherein signals are sent to the NIU from the user input device using DTMF tones. The NIU is configured to receive the DTMF tones and use the tones to effect configuration of the NIU.

Another use of the NIU is in connection with an intercom system in a user facility, according to another example embodiment of the present invention. The intercom system includes audio receivers, such as microphones, and audio speakers. The speakers may, for example, include the audio speakers adapted for use in connection with other appliances in the facility, such as those connected for stereo listening or television viewing. A user sends an intercom message, such as by depressing a button and speaking into a microphone, and the audio information is sent to the NIU. The NIU is programmed to deliver the audio information to one or more audio speakers in the facility. The intercom system may also include a selection arrangement, wherein the user selects the destination of the audio signal when the signal is sent, such as prior to depressing an intercom button. This is particularly useful when it is desired to send the intercom signal so that it is heard over another audio signal, such as a stereo signal. For instance, when loud music or other audio is being played in a portion of the facility, a conventional intercom system may not generate a loud enough signal to be heard. By using the NIU, the loud music or other audio can be reduced in volume so that the intercom message can be heard.

Another example embodiment of the present invention includes using an audio input, such as a microphone that is part of an intercom system, together with an NIU to monitor audio in a user facility. For example, the NIU can be configured by a user to receive audio data from a microphone located in an infant's sleeping area, and transmit the audio to a particular appliance in the facility. The audio data can be sent to an audio speaker where the infant's sounds can be monitored. In this manner, an infant can be monitored throughout the facility.

In a more particular example embodiment, the NIU is configured to transmit the audio data to another appliance, such as a wireless phone. The wireless phone receives the audio data, enabling audio monitoring of the facility at a remote location. This is useful in many applications, such as for security monitoring, monitoring an infant, or for a parent wanting to monitor children while away from home. In a more particular example embodiment, the NIU is configured to transmit a signal upon receiving audio data above a certain sound level. For instance, a microphone may be used for detecting an intrusion, or for monitoring the audio level of an infant. The NIU is configured to detect the sound level of the incoming signal, and to transmit a second signal to an appliance upon detecting that the sound level is above a configured threshold level. The threshold level is set to correspond to a user-defined occurrence, such as an infant's cry (i.e. used in a manner such as a typical baby monitor is used) or an intrusion resulting in breaking glass or other audible incident.

One particular application involving the detection of an infant's cry includes sending a page signal upon detecting the cry. This is particularly useful for monitoring an infant in a manner that does not necessarily require the individual doing the monitoring to be able to hear the infant. For example, a pager can be set to vibrate in response to a signal. Using this feature, a NIU is configured to send a page upon receiving a signal from an audio source that is above a particular level. The page may be sent directly to a pager, or may be sent via an external-services provider. The ability to monitor an infant without necessarily being able to hear is important for individuals who are deaf or hard-of-hearing, or for an individual located in an area having high sound levels, such as a person riding a lawn mower, operating loud equipment, or listening to loud music.

In another example embodiment of the present invention, the NIU is configured to receive video data from a video capture appliance in a user facility. The video data may then be sent to another appliance for further use. For example, one or more security cameras can be located in the facility and coupled to a bus leading to the NIU. The NIU is configured by the user to direct the incoming video data to an appliance, such as a VCR or other video recorder, or to direct the incoming video data to an external-services provider, such as a security monitoring provider. The NIU is optionally configured by the external-services security provider, and the configuration includes the selection of video data from a particular appliance to be sent to the external-services provider. In another example, the NIU is used to route video data, such as that supplied by a VCR or other movie playback device, to one or several viewing locations in the home. By coupling several appliances with the NIU via the bussing arrangement, the control, distribution, and use of information such as video data is easier to accomplish.

In another example embodiment related to the distribution of video data, both video and audio data for a particular audio-visual communication, such as a movie, are distributed from the NIU to separate audio and video appliances. This eliminates the need for appliances, such as a TV, VCR, or DVD player to be connected directly to a stereo or other audio output system. Using a connection to the NIU via the bussing arrangement, the audio is sent directly to an audio output device.

The appliances coupled to the bussing arrangement in the user facility are configured using the NIU and a user input device, according to another example embodiment of the present invention. The NIU is adapted to retrieve configuration information for the appliances. The configuration information may, for example, be stored in a data memory at the NIU, or may be available at the appliance itself for delivery to the NIU via the bussing arrangement. A user connects to the NIU via a user input device, such as a TV or a computer, and views the configuration of appliances connected to the NIU via the bussing arrangement. The user then selects configuration changes, if desired, and the changes are made via the NIU. The configuration changes may include changes made to the appliance itself, and may include changes made at the NIU for distribution of the appliances.

For example, one configurable appliance includes a telephone. Telephone services, such as a dynamically allocated telephone number, call waiting, caller ID, answering options, forwarding options, message storage options, message on hold options, call blocking options, address book information, directory assistance options, and call screening options are displayed for user selection. The user selects choices from the display, and the selections are used for configuration of the telephone appliance via the NIU. This configuration is applicable to traditional telephones using a POTS system, to Internet telephones, wireless telephones, and packet-based telephones, to name a few examples.

The NIU is adapted to assign Internet protocol (IP) addresses to particular Internet appliances in a user facility, according to another example embodiment of the present invention. In a similar manner as the telephone configuration described above, one or more Internet appliances are configured. For example, incoming data can be routed to a particular computer location in a house or business. This allows the use of several computers in different locations within or external to a user facility while using a particular IP address.

The user input device is adapted to configure the NIU to control household systems, such as heat, air conditioning, lighting, water, and security systems, according to another example embodiment of the present invention. The control can be accomplished from an internal or external location. For example, controlling the systems externally is advantageous for making changes when not at home, such as by turning on lights or turning up the heat or air conditioning prior to arriving home. This can be accomplished, for example, using a simple telephone and calling the NIU, or using an Internet connection and connecting the NIU via the Internet. Passwords or other protective methods may be used to provide secure access. In one particular embodiment, a password is entered via a telephone or via the Internet. In another application, the NIU checks the Internet protocol address of the sender and verifies that the address is authorized to make changes.

In another implementation, the NIU is further adapted to use compression and decompression technology to communicate data. In one particular example embodiment, the NIU receives compressed information, such as video telephony information, from an external source. The NIU decompresses the information and delivers it to an appliance in the user facility. A user receives the information via the appliance, and sends information back to the external source via the NIU, which compresses the data prior to sending it. For more information regarding example uses such as compression/decompression and multimedia processing technology, reference may be made to U.S. Pat. No. 5,379,351 entitled "Video Compression and Decompression Processing and Processors," and to multimedia processing kits, such as described in connection with "8×8 Application Note: Symphony VoIP Access Gateway" (filed as an Appendix to the underlying provisional application) which is available from 8×8, Inc. of Sunnyvale, Calif.

While the present invention has been described with reference to several particular example embodiments, those skilled in the art will recognize that many changes may be made thereto without departing from the spirit and scope of the present invention, which is set forth in the following claims.

What is claimed is:

1. A network interface circuit comprising:
    an external interface configured to communicate, over the Internet, with a service provider of multimedia content;
    a data memory circuit;
    an internal interface configured to communicate with a plurality of output devices each having at least one of audio and video output capabilities;
    a processor circuit configured to
        receive a request that identifies multimedia content;
        send a request for the identified multimedia content to the service provider of multimedia content;
        receive the requested multimedia content over the external interface;
        convert the received multimedia content from a packet-based Internet Protocol to a non-packet-based digital format;
        store the non-packet-based digital format of the media content in the data memory circuit;
        in response to a user request that is for the multimedia content and that is received by the network interface circuit subsequent to the storage of the multimedia content,
            access configuration information associated with the multimedia content;
            authorize access to the multimedia content in response to the configuration information; and
            retrieve, in response to the authorization, the non-packet-based digital multimedia content from the data memory circuit;
        select a format, from a plurality of formats, that corresponds to audio-visual output capabilities of a particular output device of the plurality of output devices;
        convert the non-packet-based digital multimedia content to the selected format; and
        transmit, in the selected format and using the internal interface, the multimedia content to the particular output device.

2. The network interface circuit of claim 1, wherein the authorization of access to the multimedia content includes verification of the user request against a timeframe for accessing the multimedia content.

3. The network interface circuit of claim 1, wherein the multimedia content includes a movie selected from a plurality of movies available for download on demand.

4. The network interface circuit of claim 1, wherein the external interface is configured to receive the multimedia content using a digital-subscriber line (DSL) connection.

5. The network interface circuit of claim 1, wherein the multimedia content includes music recordings available for download from the service provider of multimedia content.

6. The network interface circuit of claim 1, wherein the processor circuit is further configured to receive configuration information from the plurality of output devices;
store the configuration information;
access the stored configuration information for the particular output device; and
select, based upon the accessed configuration information, the format, from the plurality of formats that corresponds to output capabilities of the particular output device.

7. The network interface circuit of claim 1, wherein the particular output device is a television and the received multimedia content includes streams of audio and video.

8. The network interface circuit of claim 1, wherein the multimedia content includes a movie having video content and audio content and wherein the processor circuit formats the video content according to a first format corresponding to a television output device and formats the audio content according to a second format corresponding a separate audio output device.

9. The network interface circuit of claim 8, wherein the video content formatted according to the first format is transmitted directly to the television output device using a first communication line of the internal interface and wherein the audio content is formatted according to the second format using a second communication line of the internal interface.

10. The network interface circuit of claim 8, wherein the processor circuit is further configured to receive configuration information from a telephone call originating from an external telephone connecting to the network interface circuit through the external interface.

11. The network interface circuit of claim 8, wherein the configuration information indicates a selection of the multimedia content that is received from the external service provider interface.

12. The network interface circuit of claim 1, wherein the external service provider interface includes a modem and wherein the network interface circuit is configured to assign Internet Protocol addresses to the plurality of output devices and to transmit multimedia content to the plurality of output devices using the assigned Internet Protocol addresses.

13. The network interface circuit of claim 1, wherein the processor circuit is further configured to provide video conferencing functions by communicating videoconference data between one or more of the plurality of output devices and an external conference location.

14. The network interface circuit of claim 1, wherein the processor circuit is further configured to maintain confidentiality of the videoconference data by limiting distribution of the videoconference data to authorized output devices of the plurality of output devices indicated in the configuration data.

15. The network interface circuit of claim 1, wherein the network interface circuit is further configured to authorize access to multimedia content as a function of a billing arrangement specified in the configuration data.

16. The network interface circuit of claim 1, wherein the network interface circuit is configured to receive credit account information and to charge the credit account for the received multimedia content.

17. The network interface circuit of claim 1, wherein the internal interface includes a two-wire analog system for connection to an ordinary telephone.

18. The network interface circuit of claim 1, wherein the internal interface includes a two-wire analog line for connection to an ordinary telephone and wherein the network interface circuit is configured to provide, to an ordinary telephone connected to the two-wire analog line, caller ID information, dynamically allocable telephone numbers and call forwarding.

19. An interface device comprising:
an Internet Protocol interface that is accessibly by remote devices over the Internet;
an internal device interface configured for providing audio-visual data to a plurality of output devices;
a memory storage circuit;
a processor circuit configured for
receiving email files, video files and audio files from the Internet Protocol interface;
storing the email files, video files and audio files in the memory storage circuit;
receiving, over the internal device interface, requests, each request corresponding to at least one of the email files, video files and audio files and to a particular output device of the plurality of output devices;
retrieving, in response to the received requests, the email files, video files and audio files from the memory storage circuit;
accessing configuration data stored in the memory storage circuit, the configuration data including information regarding audio-visual communication capabilities of the particular output devices corresponding to the requests;
determining, for each of the particular output devices, a respective data format that is consistent with the audio-visual communication capabilities thereof;
formatting each respective email file, video file and audio file according to a respective determined data format;
transmitting the formatted email, video and audio files to respective output devices using the internal device interface; and
modifying the configuration data in response to data received from an output device of the plurality of output devices.

20. The interface device of claim 19, wherein the processor circuit is further configured for sending the email files to a television, a computer and an audio-only device.

21. The interface device of claim 19, wherein the processor circuit is further configured for sending the email, video and audio files to a television, a computer and a stereo system.

22. The interface device of claim 19, wherein the processor circuit is further configured for receiving DTMF tones representing configuration data, the DTMF tones received over a two-wire bus of a standard telephone.

23. The interface device of claim 19, wherein the processor circuit is further configured for displaying configuration options on a television and for receiving configuration input from a wireless remote control.

* * * * *